(No Model.) 5 Sheets—Sheet 4.
J. H. BURDICK.
MANUFACTURE OF NUTS.

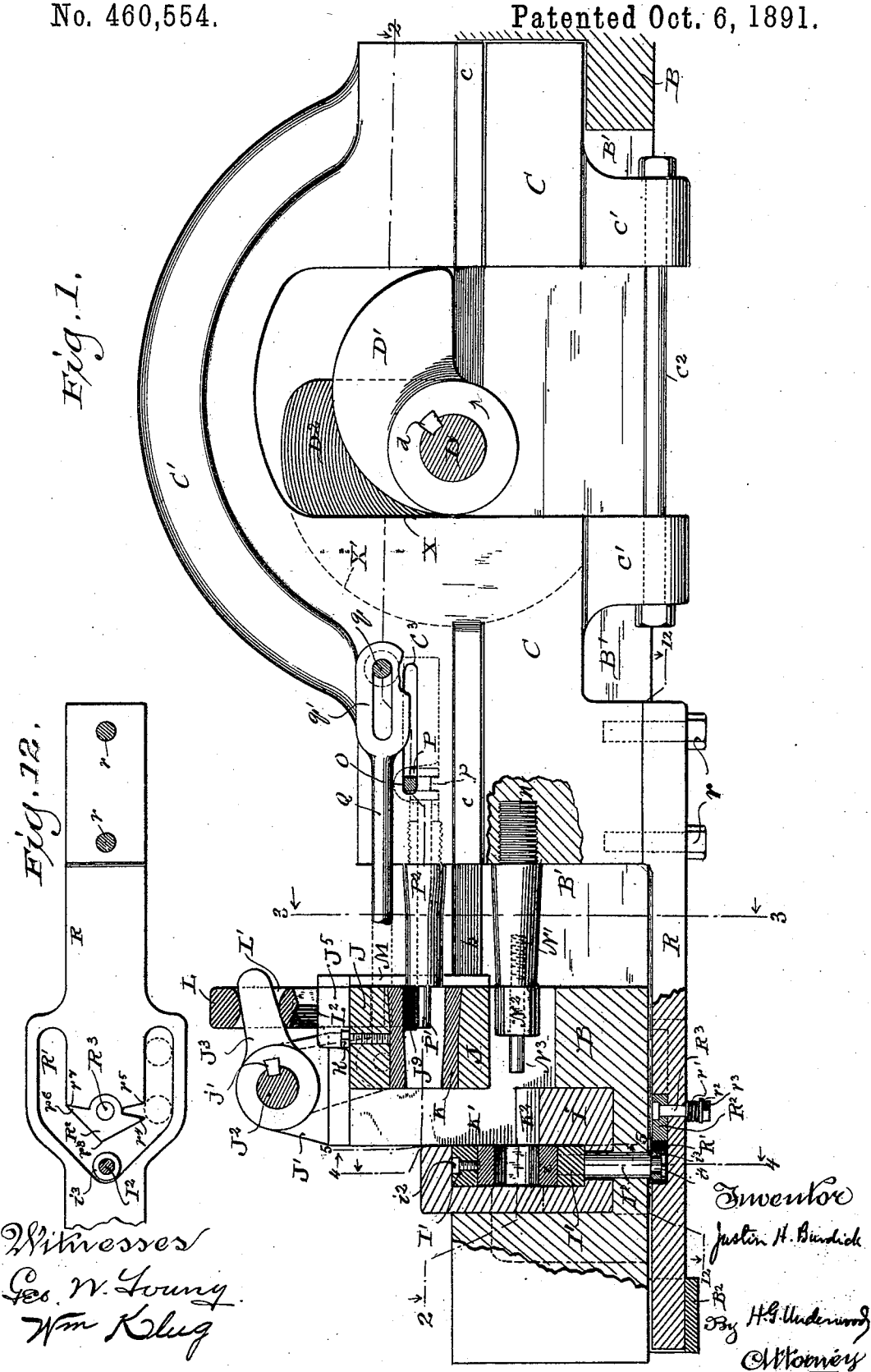

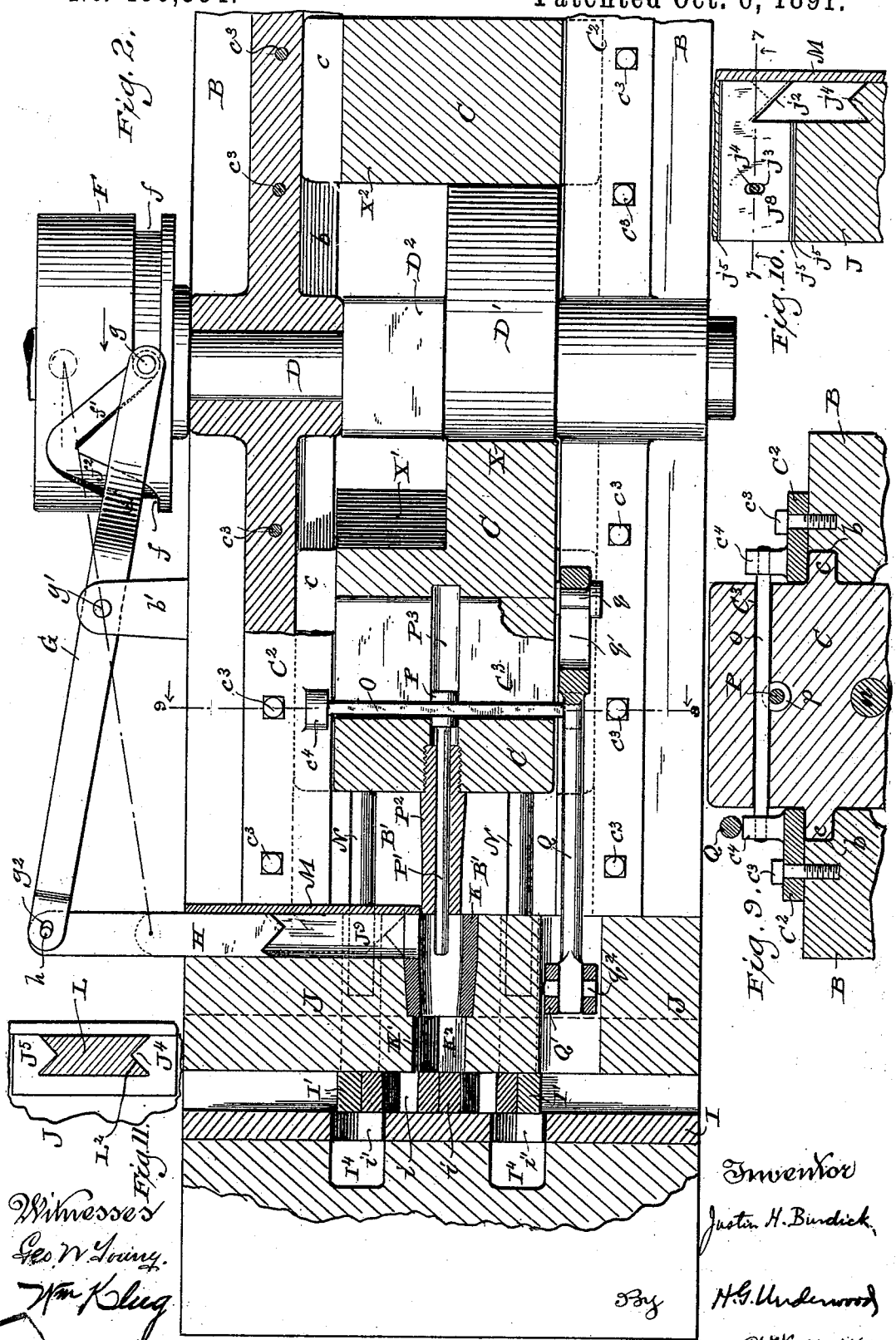

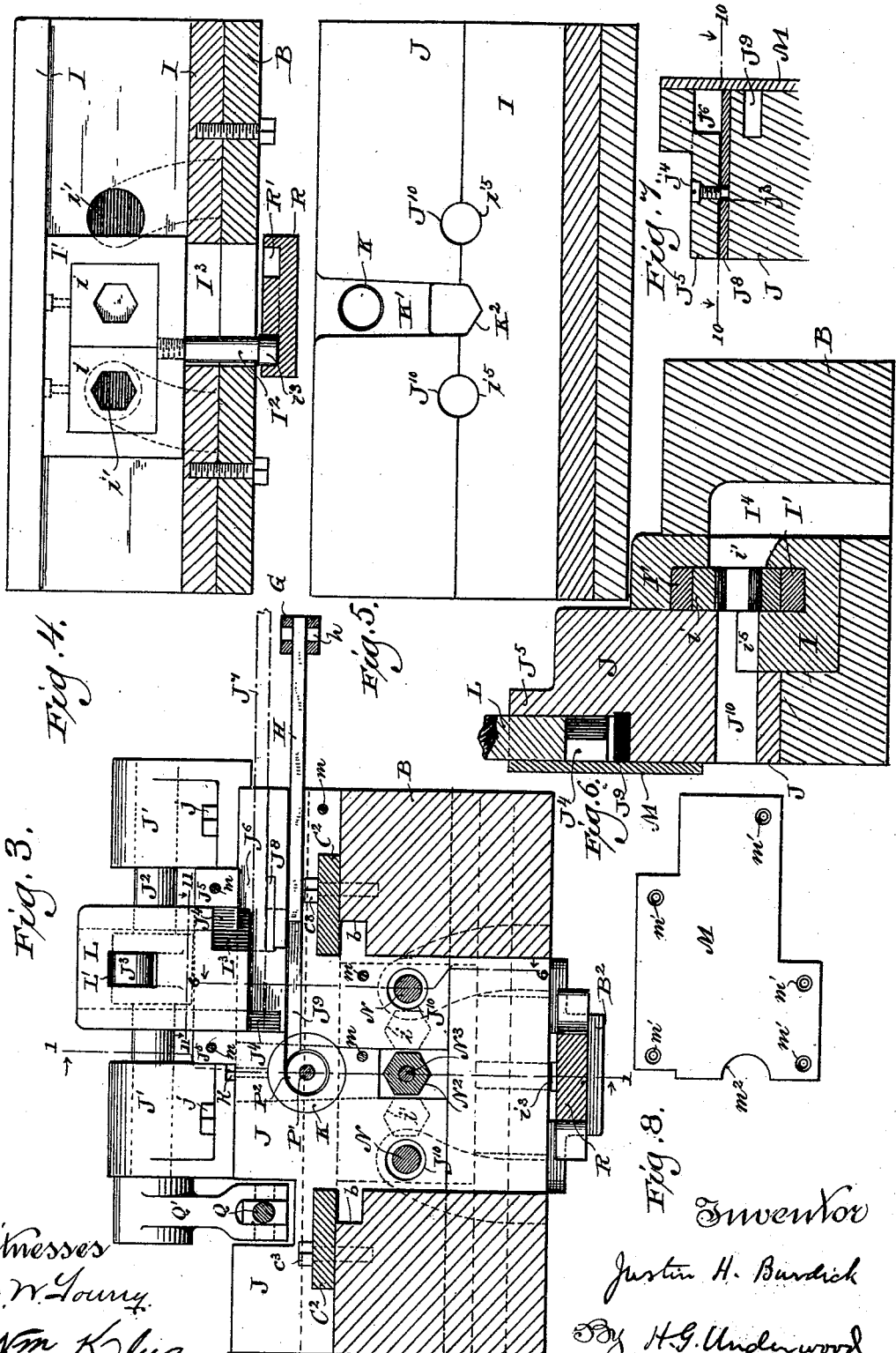
(No Model.) 5 Sheets—Sheet 3.
J. H. BURDICK.
MANUFACTURE OF NUTS.
No. 460,554. Patented Oct. 6, 1891.

No. 460,554. Patented Oct. 6, 1891.

Witnesses
Geo. W. Young.
Wm Klug

Inventor
Justin H. Burdick
By H. G. Underwood
Attorney (No Model.) 5 Sheets—Sheet 5.

J. H. BURDICK.
MANUFACTURE OF NUTS.

No. 460,554. Patented Oct. 6, 1891.

Witnesses
Geo W Young
Wm Klug

Inventor
Justin H. Burdick
By H.G. Underwood
Attorneys

UNITED STATES PATENT OFFICE.

JUSTIN H. BURDICK, OF MILTON, ASSIGNOR TO THE ELASTIC NUT COMPANY, OF MILWAUKEE, WISCONSIN.

MANUFACTURE OF NUTS.

SPECIFICATION forming part of Letters Patent No. 460,554, dated October 6, 1891.

Application filed November 17, 1890. Serial No. 371,699. (No model.)

*To all whom it may concern:*

Be it known that I, JUSTIN H. BURDICK, a citizen of the United States, and a resident of Milton, in the county of Rock, and in the State of Wisconsin, have invented certain new and useful Improvements in the Manufacture of Nuts; and I do hereby declare that the following is a full, clear, and exact description thereof.

My invention relates to the manufacture of nuts; and it consists in certain peculiarities of construction of a nut-making machine, as well as certain methods of forming nuts, all as will be fully set forth hereinafter and subsequently claimed.

Figure 17:
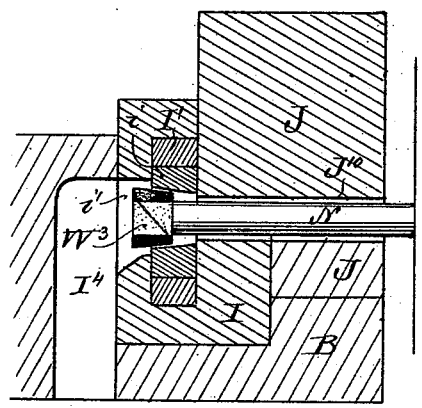
Figure 18:
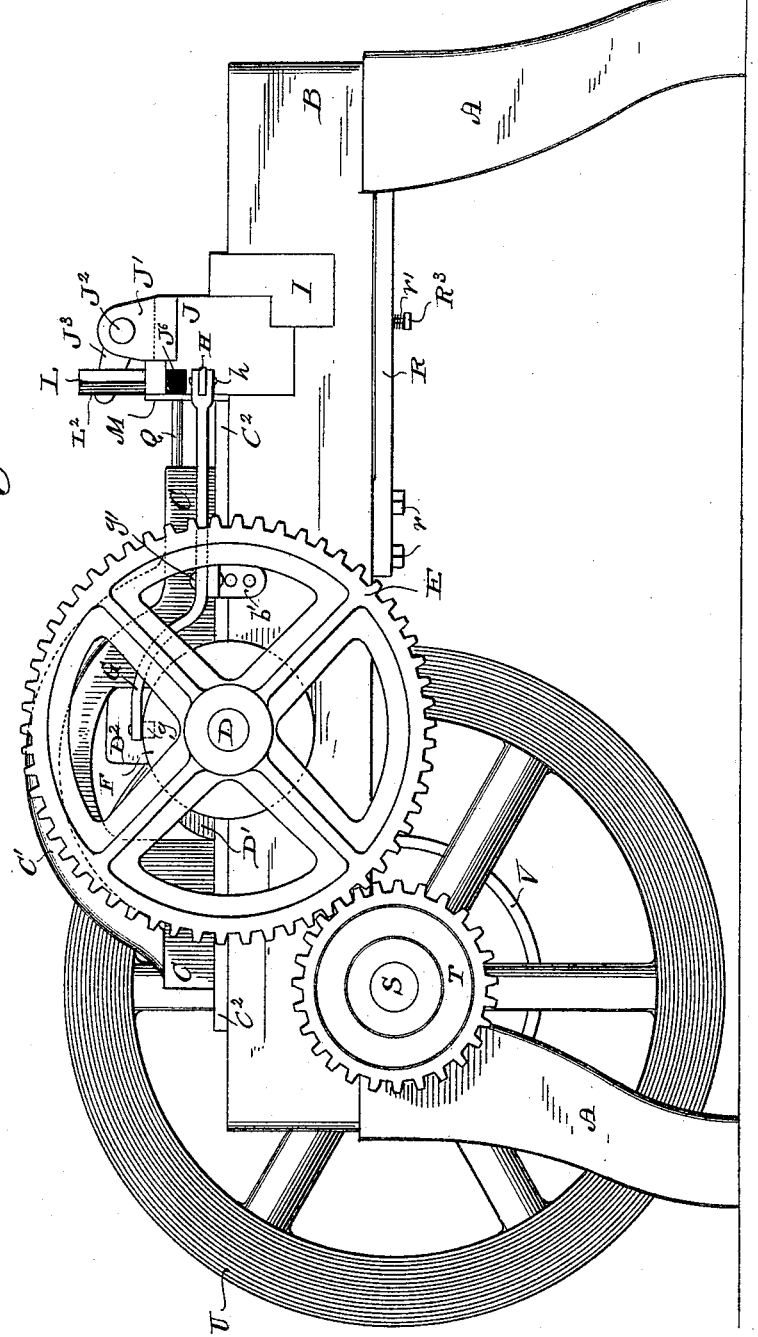

In the drawings, Figure 1 is a side elevation of my improved machine, parts being broken away and partly in section, on the line 1 1 of Fig. 3, and the base and legs not being shown. Fig. 2 is a plan view of the same, partly in horizontal section, on the line 2 2 of Fig. 1. Fig. 3 is a vertical transverse section on the line 3 3 of Fig. 1, the covering-plate being removed and shown separately in Fig. 8. Fig. 4 is a vertical transverse sectional view on the line 4 4 of Fig. 1, but with the movable die-block and actuating parts in a different position. Fig. 5 is a section on the line 5 5 of Fig. 1. Fig. 6 is a like section on the line 6 6 of Fig. 3. Fig. 7 is a detail section on the line 7 7 of Fig. 10. Fig. 8 is a detail view of the covering-plate referred to above. Fig. 9 is a transverse vertical section on the line 9 9 of Fig. 2. Fig. 10 is a detail section on the line 10 10 of Fig. 7. Fig. 11 is a detail section on the line 11 11 of Fig. 3. Fig. 12 is a detail section on the line 12 12 of Fig. 1. Figs. 13 to 17 are diagrammatic detail views illustrating the operation of the machine. Fig. 18 is a side elevation of the machine on the side opposite that shown in Fig. 1.

A A represent the legs or supports of my machine, and B the bed-plate, which latter is shown as having a central longitudinal recess $B'$ for the greater part of its length, the side walls of which are shown formed with longitudinal grooves $b$, which receive in the construction illustrated longitudinal ribs $c$ on the sides of a yoke C, which moves within said recess $B'$, said recess extending through the bottom of the bed-plate, as best shown in Fig. 1, through which bottom opening project the lugs $c'$ of said yoke, said lugs being connected together by a tie-rod $c^2$, and the front and rear portions of the said yoke C being united by an arch $C'$, and plates or caps $C^2\ C^2$ are secured by bolts $c^3\ c^3$ to the bed-plate B, so as to project over and confine the said ribs $c$, forming in effect the upper walls of the said grooves $b$.

Beneath the arch of the described yoke C is located a transverse shaft D, having suitable bearings in the bed-plate B and carrying at one outer end a gear-wheel E, and intermediate of said gear-wheel and the bed-plate also carrying a cam-wheel F, while beneath the arch $C'$ the said shaft D is provided with a driving-cam $D'$ and a retracting-cam $D^2$, preferably keyed to said shaft, as indicated at $d$. The cam-wheel F is provided with a circumferential groove, which is straight for nearly its entire distance, as shown at $f$, the ends of this straight portion being connected by angular portions $f'\ f^2$, said cam-groove receiving a roller $g$ at the free end of a bent lever G, which is pivoted, as shown at $g'$, to a bracket $b'$, projecting from one side of the bed-plate B, the other end of said lever being preferably bifurcated and there provided with oblong slots $g^2$ for loose pivotal connection with the outer end of a pusher-bar H, as shown at $h$, and hereinafter further described.

At the front end of the machine the bed-plate B is cut out transversely a certain depth to receive a casing I, which contains a shifting or reciprocating die-block $I'$, which latter in turn contains a pair of dies $i\ i$, which are just alike and interchangeable, set-screws $i^2$ being shown as an added (though not absolutely necessary) means of keeping said dies in place in the die-block. $I^2$ is a stud whose upper end is screw-threaded and enters a screw-threaded perforation in the under side of the die-block $I'$, the lower end of this stud having a roller $i^3$ secured thereto by means of a screw $i^4$, and said stud moving in a slot $I^3$ in the under side of the casing I and bed-plate B.

J is a casting which extends across the machine transversly, the greater part of which is back of the rear vertical line of the casing I, but with its front portion extending over the rear portion of the said casing I. This casting is centrally cut out to receive the ringing-die K, which may be secured in place as by set-screw k. On top of this casting J are secured by bolts j the boxes or bearings J' for the shaft J² of the rocker-arm J³, whose hub is keyed to said shaft, as shown at j'. L is the shear, which is carried by the said rocker-arm J³, which passes through a perforation L' in said shear, which perforation has convex upper and lower walls to afford a rounded bearing for said arm.

The vertical edges of the shear are formed with V-shaped concaves or depressions L², which fit within convex V-shaped guides J⁴ in an upward extension J⁵ of the casting J, (and which guides may have brass lines,) the said shear having an oblique cutting-edge L³ on its under side, where the angle of one line of its concave vertical guiding-edge is continued across to the rear face of the shear.

Below the bottom of the shear (when elevated) is an opening J⁶ from one end in the casting J to receive a bar of metal, (shown at J⁷ in dotted lines in Fig. 3,) and below this is the horizontal shear-plate J⁸, whose edge j² is exactly the shape of the cutting-edge L³ of the shear above. This shear-plate is formed with an oblong slot j³, through which the end of set-screw j⁴ passes (which screw first passes through the upward extension J⁵ of the casting J) to hold the shear-plate J⁸ firmly in place after it has been adjusted, to take up wear by means of the movable strips j⁵ j⁵, which may be placed on either side of the longitudinal edges of said plate, if necessary, so that the cutting-edge j² of the said shear-plate may always coincide with the cutting-edge L³ of the shear L above. Below the shear-plate there is another opening J⁹ from one end of the casting J, which opening extends into the ringing-die K. The rear edges of all these openings and parts are concealed by the covering-plate M, Fig. 8, which plate, as stated, is removed in Fig. 3, in which view, however, are shown the screws m m—five in number—which pass through the screw-holes m' m' in said plate to secure it to place, the rounded notch m² in said plate M coinciding with the bore of the ringing-die K, from the front face of which die K there is a vertical passage K', at the base of which is a V-shaped groove or rest K², formed in the casing I.

The casting J is further provided with two circular openings J¹⁰, extending therethrough, there being registering-openings i' through the casing I, (preferably beveled or inclined on their lower walls,) and these openings i' being themselves in register with vertical chutes or passages I⁴ for the finished blank nut, as hereinafter described. The upper surface of the rear part of the casing I is concaved to correspond with the said openings J¹⁰, as best shown at i⁵ i⁵ in Figs. 5 and 6. These openings J¹⁰ are to receive the ejectors N N, which project from the front end of the yoke C in horizontal line with the crowner N² and its stem or shank N', which latter also projects from said yoke C, being screwed therein, as shown at n in Fig. 1, the ejectors being similarly screwed into the front of said yoke. The crowner N² may either be integral with its shank N' or screwed into the end thereof, as preferred, and the nut-mandrel N³ is screwed through the crowner N² and into its shank N', as shown in dotted lines in Fig. 1.

Rising from the caps or plates C² C² are lugs c⁴ c⁴, which receive the ends of a transverse rod O, preferably square in cross-section, which rest, in the groove p of a spool P, from which there extends forward the ring-mandrel P', surrounding which is a plunger P², which is screwed into the front of the yoke C above the crowner-shank N'. The yoke C, back of the rod O in the position of parts shown in Fig. 2, is cut out, as shown at C³, to afford a free passage for said bar O in the forward movement of the said yoke, and for a like reason the slot P³ is formed in said yoke in the line of the spool P.

Projecting from one side of the yoke C is a stud q, which loosely engages with the oblong slot q' in one end of a pitman Q, whose other end is connected by a pivot q² with the forked outer end of a crank-arm Q' on one end of the shaft J², which carries the rocker-arm J³, that operates the shear L.

R is a cam-plate secured to the under side of the front portion of the yoke C as by bolts r r and projecting forward therefrom, its front end having a bearing in the loop B², projecting from the lower front end of the bed-plate B. This cam-plate is provided with the cam-groove R' and a movable pointed cam R², which is secured in place by a bolt R³, extending through the said plate R and having a spring r' interposed between the bottom of said plate and the washer r² and nut r³ on the lower end of said bolt.

S is the main or drive shaft of the machine, and carries a gear-wheel T at one end, which meshes with the before-named gear E on the shaft D, and at its other end the said shaft S carries a fly-wheel U and a pulley V for the belt connecting with the source of power.

The operation of my machine will be readily understood from the foregoing description of its construction.

Figure 13:
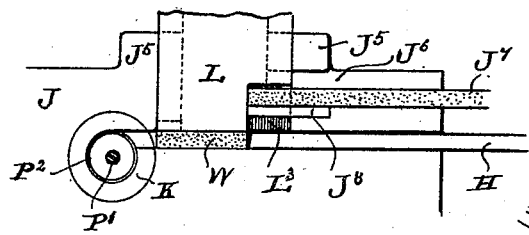
Figure 16:
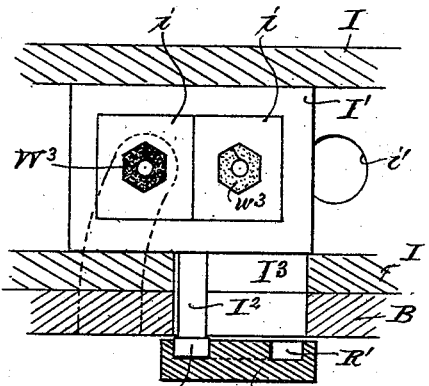
Figure 14:
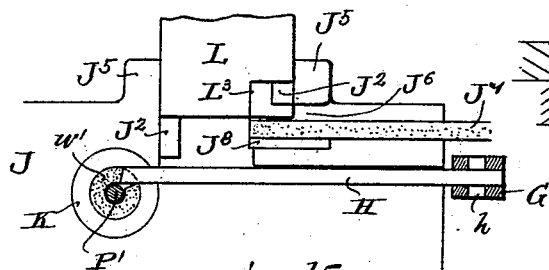
Figure 15:
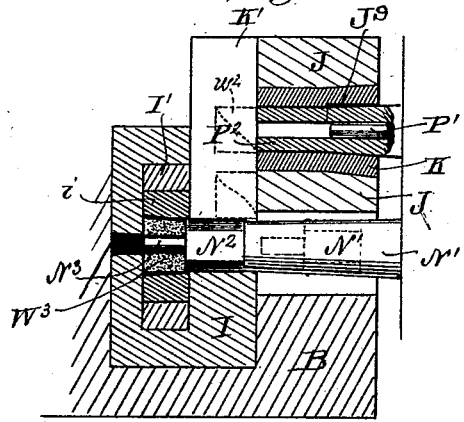

The various parts are supposed to be in the positions shown in Figs. 1 and 3, and the hot bar of iron or steel J⁷ is represented by dotted lines in Fig. 3 as having been fed in through the opening J⁶ to place beneath the shear L. The machine being in operation and the shaft D revolving in the direction of the arrow, this brings the driving-cam D', fast on said shaft, against the rear wall X of the forward portion of the yoke C, thereby forcing said yoke and its attachments forward, and this carries the stud q to the forward end of the slot q' in the end of the pitman Q, and then the said pitman moves forward, thereby forcing the crank-arm Q' outward and turning the rock-shaft J², whereby the rocker-arm J³ thereon will depress the shear L, and the hot metal bar J⁷ will be cut by the edge L³ of said shear L as it descends past the edge j² of the shear-plate J⁸, carrying this cut-off portion W with it, as shown best in Fig. 13. This extreme forward movement of the yoke C requires only a half-revolution of the shaft D, thereby carrying the roller $g$ at the end of the bent lever G to a point in the straight portion $f$ of the cam-groove of the cam-wheel F opposite the point shown in Fig. 2, and as the shaft D continues to revolve the retracting-cam D² (which has simply swept past the clearance X' in the rear wall X of the yoke) now bears against the front wall X² of the rear portion of the yoke C and forces said yoke back again, (in one quarter-revolution of said shaft D,) which brings the roller $g$ to about the point of junction of the portions $f f^2$ of the cam-groove in wheel F, and then as the shaft D completes the last quarter of its first revolution the yoke C remains stationary, while the roller $g$ moves first to the apex of the cam-groove, (junction of $f^2 f'$,) the pusher-bar H being thereby forced inward in the opening J⁹ and pushing the cut-off portion W of the hot metal bar before it into the ringing-die K around the ring-mandrel P', as best shown in Fig. 14, forming an open ring W', and then the roller $g$ moves the length of the portion $f'$ of the cam-groove back to the position shown in Fig. 2, which draws the pusher-bar H back to the position shown in said drawing. The shaft D makes its next revolution precisely as before, (the shear cutting off another portion W of the hot metal bar,) and in the forward movement of the yoke the plunger P² forces the open ring W' just made through the ringing-die K, which has a converging or "choke" bore, as shown in Fig. 1, and this closes the open ring W' as it is forced through the die, so that it is a closed ring W², that drops down the passage K', (first resting on the crowner N², as shown in the lower dotted portion of the ring W² in Fig. 15,) and then as the yoke and crowner move backward this ring W² drops into the V-shaped rest K² in the casing I, the die-block I' and its dies $i\,i$ having been moved by the action of the roller $i^3$ on the lower end of the stud I² in the cam-groove R' of the plate R to the position indicated in dotted lines in Fig. 3 and in full lines in Fig. 2 at the end of the backward movement of said yoke. As the said yoke moves forward again, the die-block I' is moved by the action of the stud I² and its roller $i^3$ in the cam-groove R' of plate R into the position shown in Fig. 4, and as the yoke, with its attachments, advances the nut-mandrel N³ enters the hole in the closed ring W² (which, as stated, is in the V-shaped rest K² of the casing I) and the crowner N² pushes the ring W² into the adjacent die $i$, thereby forming and crowning the nut W³, as shown in Fig. 15. The bore of the dies flares outwardly a trifle, as is best shown in Fig. 17, and hence as the mandrel and crowner recede in the next backward movement of the yoke the nut W³ is stripped off therefrom and remains in the die. When the yoke comes forward again, the ejectors N enter the openings J¹⁰ and one of said ejectors pushes out the nut W³ just made through the opening $i'$ into the chute I⁴.

It will be understood that all the described parts of the machine are working simultaneously and successively, and while for the sake of avoiding confusion I have followed the making and ejecting of a single nut from the metal bar through all the necessary movements of the machine that at the same time other nuts are in all the preliminary and intermediate stages—that is, while the described first nut is being ejected from one of the dies $i$ another is being formed by the nut mandrel and crowner in the other die $i$, an open ring W' is being pushed through the ring-die K to form a closed ring W², and a blank portion W is being sheared off the metal bar J⁷ and pushed down to place in the passage J⁹.

As the die-block I' contains a pair of dies $i\,i$, the hereinbefore-referred-to cam-plate R, Fig. 12, is employed to shift said die-block I' back and forth in the casing I, so as to successively present one or the other die empty and open in line with the crowner to receive a ring W² and at the same time to place a die containing a completed nut W³ in line with one or the other of the openings $i'\,i'$ in the said casing and also in line with one or the other of the ejectors N N. This is accomplished by means of the pointed cam R², pivoted in said plate R, the point $r^8$ of this cam determining on which side thereof the roller $i^3$ shall move, and such movement of the roller, in passing and pressing against the adjacent side of the cam R², will carry the point $r^4$ of said cam (in the position shown in Fig. 12) against the point $r^5$ of the cam-plate R, thereby opening a passage for the roller $i^3$ to the extreme end of the cam-groove R' on that side and automatically shifting the point $r^8$ to the opposite side of the center line of the plate R, so that in the next forward movement of the yoke C (to which, as described, the plate R is attached) the roller $i^3$ will be guided into the opposite arm of the cam-groove R' and will close the point $r^6$ of the cam against the point $r^7$ of the plate, (which had been separated by the first described movement,) and hence the stud I², attached to said roller $i^3$, will carry the die-block I' in a direction just the opposite of that in which it was first moved, and this alternate movement of the die-block is thus rendered continuously and automatically alternating, the position of the dies with relation to the crowner and ejectors being determined by the position of the roller $i^3$ in the angular portion of the slot R', and the die-block is held in its adjusted position with the dies in line with said crowner and one of the ejectors when the said roller $i^3$ is in one of the straight portions of the said slot R'.

Having thus described my invention, what

I claim as new, and desire to secure by Letters Patent, is—

1. In a nut-making machine, the combination, with a stationary ringing-die having a converging bore, of a mandrel projecting within said bore, an independently-movable plunger surrounding said mandrel, and mechanism for moving said plunger the length of said bore and for retracting it therefrom, substantially as set forth.

2. In a nut-making machine, the combination, with a stationary ringing-die having a converging bore and a blank-opening communicating therewith, of a mandrel projecting within said bore, an independently-movable plunger surrounding said mandrel, a shear and shear-plate adjacent to said ringing-die, a pusher-bar reciprocating in line with said blank-opening in the ringing-die, and mechanism for operating said movable parts successively, substantially as set forth.

3. In a nut-making machine, the combination, with a suitable frame, of a stationary casing provided with a pair of openings, a movable die-block in said casing, a pair of stationary solid open dies in said die-block, and mechanism for reciprocating said die-block, so that one of said dies shall be in register with one of said openings and the other against the solid wall of said casing, alternately, substantially as set forth.

4. In a nut-making machine, the combination, with a suitable frame, of a stationary casing provided with a pair of openings, a transversely-reciprocating die-block in said casing, a pair of stationary solid open dies in said die-block, a longitudinally-reciprocating mandrel and crowner, and mechanism for operating said movable parts successively, substantially as set forth.

5. In a nut-making machine, the combination, with a suitable frame, of a stationary casing provided with a pair of openings, a transversely-reciprocating die-block in said casing, a pair of stationary solid open dies in said die-block, a longitudinally-reciprocating mandrel and crowner, and a pair of longitudinally-reciprocating ejectors in line with said openings in the casing, and mechanism for operating said movable parts, substantially as set forth.

6. In a nut-making machine, the combination, with a suitable frame provided with a longitudinal recess, of a yoke reciprocating therein, a transversely-revolving shaft in said frame, a driving-cam and a retracting-cam fast on said shaft for engagement with the inner walls of said yoke, a stud projecting from said yoke, a transverse rock-shaft supported in raised bearings near one end of the frame, a shear-plate in said frame, a vertically-reciprocating shear moving in bearings above said shear-plate, a rocker-arm on said rock-shaft in engagement with said shear, a crank-arm projecting from the end of said rock-shaft, and a pitman pivoted at one end to said crank-arm and loosely linked at the other end to said yoke-stud, substantially as set forth.

7. In a nut-making machine, the combination, with a suitable frame provided with a longitudinal recess, of a yoke reciprocating therein, a transverse revolving shaft in said frame, a driving-cam and a retracting-cam fast on said shaft for engagement with the inner walls of said yoke, a wheel fast on the end of said revolving shaft and having a cam-groove in its periphery, a stationary ringing-die having a converging bore and a blank-opening communicating therewith and with a transverse passage in the frame, a reciprocating pusher-rod in said transverse passage, a lever pivoted to the frame and linked to said pusher-rod at one end, a roller at the other end of said lever engaging with the said cam-groove, a revoluble mandrel attached to the frame and projecting into the bore of the ringing-die, and a plunger surrounding said mandrel and projecting from said yoke in line with said die-bore, substantially as set forth.

8. In a nut-making machine, the combination, with a suitable frame provided with a longitudinal recess, of a yoke reciprocating therein, a transverse revolving shaft in said frame, a driving-cam and a retracting-cam fast on said shaft for engagement with the inner walls of said yoke, a cam-plate projecting from the under side of said yoke and having a cam-groove formed therein and a movable pointed cam pivoted thereto, a stationary transverse casing provided with a pair of openings, a movable die-block in said casing, a pair of stationary solid open dies in said die-block, a stud projecting from said die-block and in engagement with said cam-groove, a mandrel and crowner projecting from said yoke in line with one or the other of said dies alternately, and a pair of ejectors also projecting from said yoke in line with the pair of openings in said casing, substantially as set forth.

9. The hereinbefore-described method of making nuts, consisting in first cutting off a section of a hot bar of iron or steel, forcing the same around a revoluble mandrel within a die, forming an open ring, forcing said open ring through a contracted bore in said die, thereby closing said ring, and then pressing said closed ring into shape around a stationary mandrel within a solid die and stamping a crown upon one end thereof, completing the nut, substantially as set forth.

In testimony that I claim the foregoing I have hereunto set my hand, at Milwaukee, in the county of Milwaukee and State of Wisconsin, in the presence of two witnesses.

JUSTIN H. BURDICK.

Witnesses:
H G. UNDERWOOD,
WM. KLUG.